(12) United States Patent
Jung et al.

(10) Patent No.: US 8,414,813 B2
(45) Date of Patent: Apr. 9, 2013

(54) APPARATUS AND METHOD FOR MANUFACTURING MULTI COMPONENT PLASTIC MOLDED PARTS

(75) Inventors: Ludwig Jung, Mammendorf (DE); Marco Gruber, München (DE); Andreas Reitberger, Deggendorf (DE)

(73) Assignee: KraussMaffei Technologies GmbH, München (DE)

( * ) Notice: Subject to any disclaimer, the term of this patent is extended or adjusted under 35 U.S.C. 154(b) by 0 days.

(21) Appl. No.: 13/327,045

(22) Filed: Dec. 15, 2011

(65) Prior Publication Data

US 2012/0086141 A1    Apr. 12, 2012

Related U.S. Application Data

(63) Continuation of application No. 12/243,609, filed on Oct. 1, 2008, now abandoned, which is a continuation of application No. PCT/EP2007/053264, filed on Apr. 3, 2007.

(30) Foreign Application Priority Data

Apr. 6, 2006   (DE) .................. 10 2006 016 200

(51) Int. Cl.
    *B28B 5/02*    (2006.01)
(52) U.S. Cl.
    USPC ..... 264/294; 264/255; 264/297.3; 264/297.6; 264/297.8; 264/328.8; 264/328.11; 264/510; 264/328.1; 425/151; 425/169
(58) Field of Classification Search ............. 264/255
    See application file for complete search history.

(56) References Cited

U.S. PATENT DOCUMENTS 4,734,023 A * 3/1988 Nesch et al. ............ 425/130
5,030,406 A * 7/1991 Sorensen ................. 264/255
(Continued)

FOREIGN PATENT DOCUMENTS

DE      33 38 685    5/1985
DE      196 50 854   3/1998
(Continued)

OTHER PUBLICATIONS

Johnnaber/Michaeli, Handbuch Spritzgießen [*Handbook Injection Molding*], 2001, ISBN 3-446-15632-1, Picture 6.80 on p. 508.

(Continued)

*Primary Examiner* — Yogendra Gupta
*Assistant Examiner* — Ninh Le
(74) *Attorney, Agent, or Firm* — Henry M. Feiereisen LLC

(57) ABSTRACT

In a method of making multi-component plastic molded parts, using an apparatus which includes two outer platens with first half-molds, and a middle platen with second half-molds interacting with the first half-molds such as to define cavities in two parting planes for injection of a plastic melt and/or a PUR mixture, one of the first and second half-molds can move in increments relative to the other one of the first and second half-molds, thereby forming different cavities in the parting planes from cycle to cycle. In a first cycle preforms are produced in respective cavities and then held in one of the first and second half-molds as the other one of the first and second half-molds moves in increments. Further components can then be injected into cavities formed in the parting planes from cycle to cycle, while another process step can be executed from cycle to cycle in free half-molds.

19 Claims, 8 Drawing Sheets

U.S. PATENT DOCUMENTS

| | | | |
|---|---|---|---|
| 5,049,343 A * | 9/1991 | Sorensen | 264/255 |
| 5,773,049 A | 6/1998 | Kashiwa et al. | |
| 6,379,139 B1 | 4/2002 | Boucherie | |
| 6,613,262 B1 | 9/2003 | Arend | |
| 6,824,381 B2 | 11/2004 | Wohlrab | |
| 7,875,224 B2 | 1/2011 | Gruber | |
| 7,981,332 B2 | 7/2011 | Gruber | |
| 2004/0094866 A1 | 5/2004 | Boucherie | |
| 2004/0180108 A1 | 9/2004 | Wobbe et al. | |
| 2008/0317893 A1 | 12/2008 | Gruber | |
| 2009/0065973 A1 | 3/2009 | Jung et al. | |
| 2009/0102086 A1 | 4/2009 | Gruber et al. | |
| 2009/0218726 A1 | 9/2009 | Gruber et al. | |

FOREIGN PATENT DOCUMENTS

| | | |
|---|---|---|
| DE | 200 17 737 | 12/2000 |
| DE | 102 08 599 | 8/2003 |
| DE | 102004032362 | 1/2006 |
| EP | 1 306 185 | 5/2003 |
| JP | 62 121024 | 6/1987 |
| JP | 63135213 | 6/1988 |
| WO | WO 00/73040 | 12/2000 |
| WO | WO 01/10624 | 2/2001 |
| WO | WO 03/013824 | 2/2003 |
| WO | WO 2005035218 A1 * | 4/2005 |

OTHER PUBLICATIONS

"Hochwertige Premiumoberflächen aus Spritzgieß- und Reaktionstechnik" [*High-Quality Premium Surfaces Made by Injection-Molding and Reaction Techniques*], in: SPRITZGIESSEN, Kunststoffe, Oct. 2004, pp. 180-182.

* cited by examiner

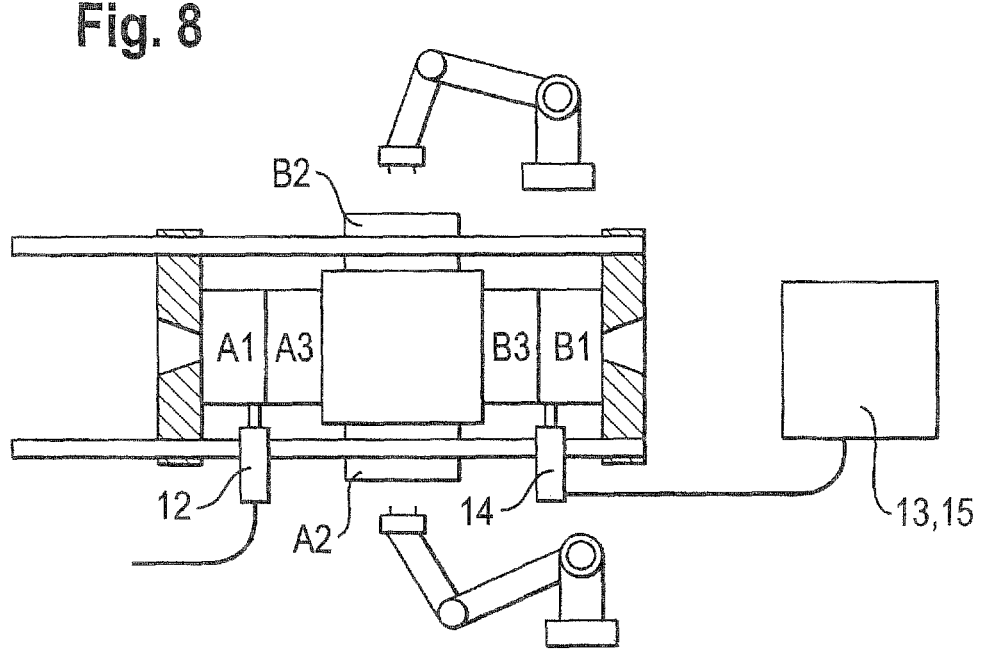
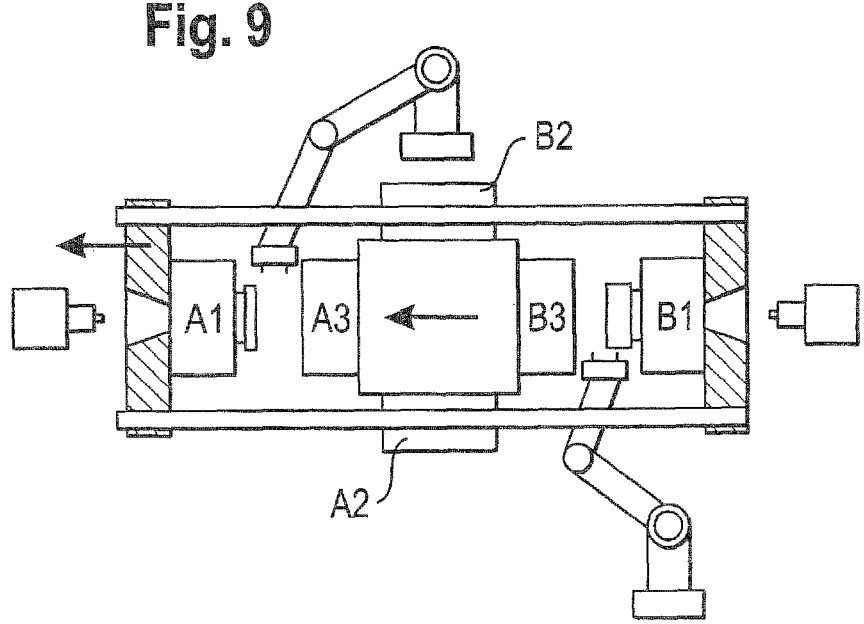

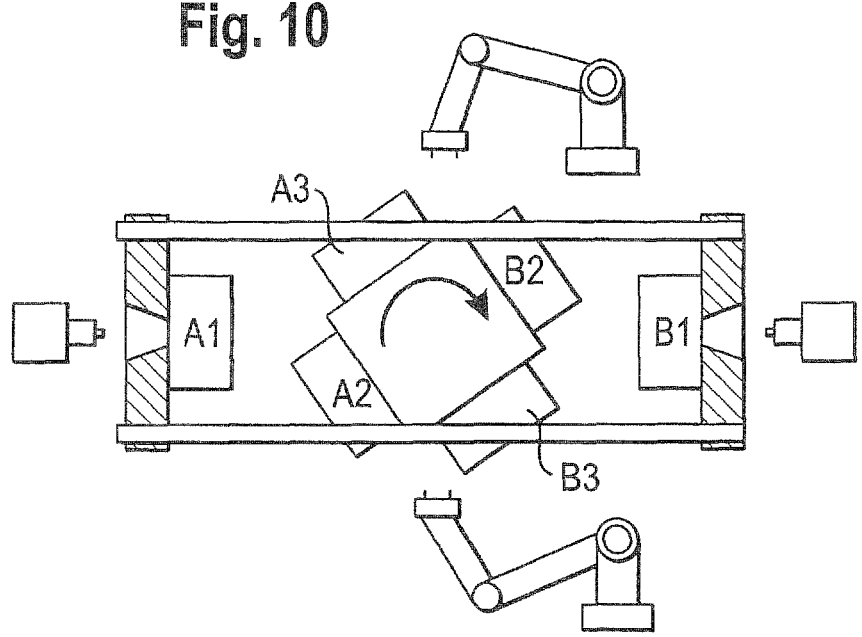
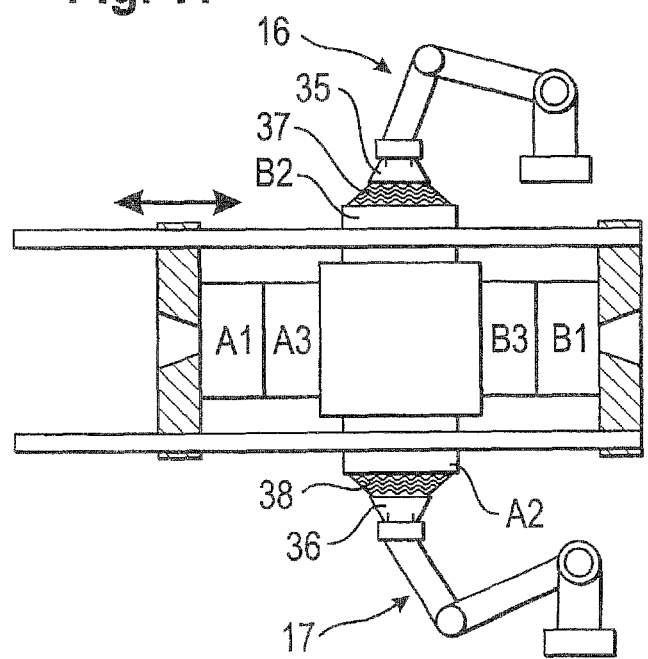

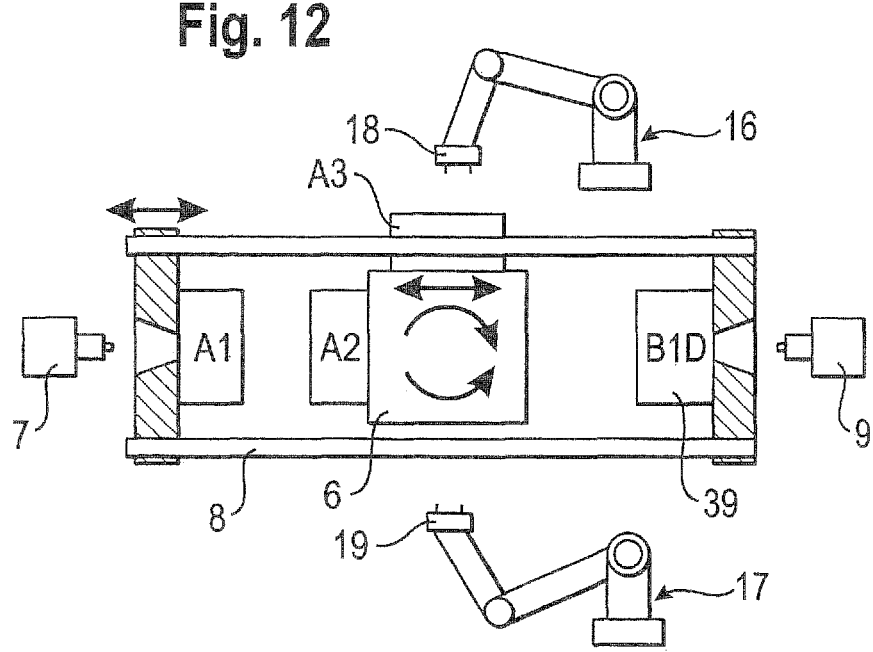
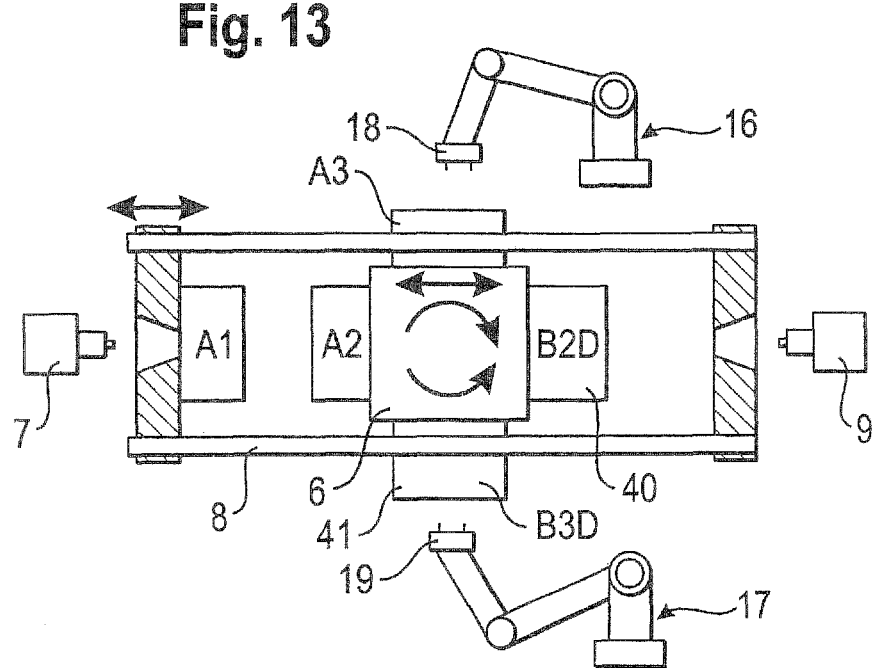

APPARATUS AND METHOD FOR MANUFACTURING MULTI COMPONENT PLASTIC MOLDED PARTS

CROSS-REFERENCES TO RELATED APPLICATIONS

This application is a continuation of prior filed U.S. application Ser. No. 12/243,609, filed Oct. 1, 2008, now abandoned, which in turn is a continuation of prior filed co-pending PCT International Application Number PCT/EP2007/053264, filed Apr. 3, 2007, which designated the United States and has been published, but not in English, as International Publication Number WO 2007/113305, and on which priority is claimed under 35 U.S.C. § 120, and which claims priority of German Patent Application, Serial Number 10 2006 016 200.5, filed Apr. 6, 2006, pursuant to 35 U.S.C. § 119(a)-(d), the contents of which are incorporated herein by reference.

BACKGROUND OF THE INVENTION

The present invention relates to an apparatus and method for manufacturing multi-component plastic molded parts.

Typically, in a first cycle of the manufacturing process of multi-component plastic molded parts, a preform is made from a first component in a first cavity. Subsequently, the second component is molded onto the preform in a second cavity. The individual components can be made of different thermoplastics and may have different colors. Certain components may also be provided with filler material. Instead of thermoplastic components, polyurethane (PUR) components can be provided. It is also known to manufacture multi-component plastic molded parts having a thermoplastic component and a PUR component.

German patent DE 196 50 854 discloses a method and an apparatus for manufacturing multi-component plastic molded parts using rotary table techniques. An injection-molded plastic part is hereby coated with at least one layer of a 2-component thermoset. Both components are successively molded in the same mold in a cycle-synchronous manner. A base plate is hereby used which carries two identical half-molds side-by-side. The base plate is supported for rotation about a horizontal and longitudinal machine axis. Female molds of an injection molding machine and a RIM apparatus are arranged opposite the half-molds. After the injecting molding machine injects thermoplastic material, the base plate is rotated by 180° about the horizontal and longitudinal machine axis. In the next cycle, a new thermoplastic part is molded and the thermoplastic part of the first cycle is coated with the 2-component thermoset.

The article "Hochwertige Premiumoberflächen aus Spritzgieβ- und Reaktionstechnik", [*High-Quality Premium Surfaces Made by Injection-Molding and Reaction Techniques*], describes on pages 180-182 in the October 2004 edition of the magazine "Kunststoffe" [*Plastics*] another method for manufacturing multi-component plastic molded parts from a first thermoplastic component and a second PUR component. A station for injecting the thermoplastic material is provided on the fixed side of a clamping unit of a known injection molding machine. On the movable side, a mixing head of a RIM apparatus (RIM: Reaction Injection Molding) for the PUR component is docked to the half-mold that is arranged there. RIM apparatuses are known and essentially include conveying and metering devices for individual chemicals to be processed, such as polyol, polyisocyanate, and possible additives, such as dyes, foaming agents, etc. A sliding table for the fixed half-mold is provided at the fixed side of the clamping unit in order to move the fixed half-mold from the position "injection molding" to the position "PUR molding", and vice versa. In the mold position "injection molding", a carrier such as a carrier made of polyamide plastics is pre-molded. At the end of the cooling period, the mold opens and the sliding table moves to the position "PUR molding". After the mold closes, the PUR molding skin is injected into the enlarged cavity via the mixing head that is connected with the RIM mixing and metering unit.

It is further known in the related art to produce multi-component plastic molded parts using so-called reversing plate techniques (Johnnaber/Michaeli, Handbuch Spritzgieβen, [Handbook Injection Molding] 2001, ISBN 3-446-15632-1, Picture 6.80 on page 508). A middle platen, often called a reversing plate, is hereby rotatably supported between two outer platens. After the preform is produced in the first parting plane, the middle platen transports the preform to the second parting plane. There, the second component is molded onto the preform.

WO 03/013824 discloses manufacturing of multi-component plastic molded parts from a thermoplastic carrier and a PUR molding skin using the reversing plate techniques. A machine frame movably supports two outer platens. A supporting frame is mounted on the machine bed between the two outer platens. In the machine bed, a middle platen is supported for rotation about a vertical rotation axis. The middle platen can be plate-shaped and receive two half-molds. Alternatively, the middle platen can be cube-shaped so as to receive four half-molds. A suitable drive-and-locking-assembly can move the outer platens towards and away from the middle platen and lock the platens. In order to produce a multi-component molded plastic part from a thermoplastic base component and a PUR molding skin, one of the outer platens can be coupled with an injection unit for the thermoplastic base component, and the other outer platen can be coupled with a RIM apparatus. Handling robots, such as a processing robot and a removal robot, can be provided to the side of the clamping unit. For example, the processing robot can treat the surface of the base component. In a first cycle, the base component is made of thermoplastic material and is injection-molded on the side of the injection unit. After the required cooling period, the clamping unit is opened and the just molded base component is surface-treated. The platen is rotated by 180°, and the half-molds are closed again. In the subsequent cycle, a new thermoplastic base component is molded on the side of the injection unit, whereas, on the opposite side, a PUR reaction mixture is injected into the mold via a mixing head and a PUR skin is formed on the surface of the base component.

Common to the prior art described above is the production of a preform in the one parting plane and molding of the second component onto the preform in the other parting plane while a new preform is produced in the first parting plane at the same time.

It would therefore be desirable and advantageous to provide a method and an apparatus to obviate prior art shortcomings and to increase productivity in producing multi-component molded plastic parts.

SUMMARY OF THE INVENTION

According to one aspect of the present invention, a method of making multi-component plastic molded parts, using an apparatus which includes two outer platens with outer first half-molds, and a middle platen with middle second half-molds interacting with the first half-molds such as to define cavities in two parting planes for injection of a plastic melt and/or a PUR mixture, includes the steps of allowing one of the first and second half-molds to move in increments in relation to the other one of the first and second half-molds to thereby form different cavities in two parting planes from cycle to cycle, producing in a first cycle preforms in the cavities respectively formed in the two parting planes between respective ones of the first and second half-molds, holding the preforms in one of the first and second half-molds as the other one of the first and second half-molds moves in increments and injecting further components into the cavities formed in the two parting planes from cycle to cycle, and allowing from cycle to cycle to execute a pretreatment or another process step in free ones of the first and second half-molds.

According to another aspect of the present invention, an apparatus for making multi-component plastic molded parts includes two outer platens having outer half-molds, a middle platen positioned between the outer platens, a clamping unit for closing and locking four of the half-molds of the outer platens and the middle platen at one time to thereby define two parting planes, wherein the middle platen carries at least two of a first type of half-molds that are different from each other and at least two of a second type of half-molds that are different from each other so as to successively form in the parting planes with the half-molds of the outer platens different cavities while leaving free half-molds for allowing pretreatment or a further process step, and wherein the outer half-molds are constructed for holding molded parts.

According to yet another aspect of the present invention, an apparatus for making multi-component plastic molded parts includes two outer platens, each having mounted thereon a plurality of half-molds, a middle platen positioned between the outer platens, a clamping unit for closing and locking four of the half-molds of the outer platens and the middle platen at one time to thereby define two parting planes, wherein the middle platen has a plurality of mold halves which are constructed to hold molded parts, wherein the outer platens move in increments in relation to the middle platen to thereby form, from cycle to cycle, different cavities in the two parting planes and leaving free half-molds for allowing pretreatment or a further process step.

The present invention resolves prior art shortcomings by allowing several production steps to be successively executed in both parting planes. This causes an increase in the cycle period. Still, as two molded plastic parts are produced in each cycle, the cycle period per molded part is less than when applying reversing plate techniques. Depending on the application, it is possible to produce, for example, in a first cycle thermoplastic preforms and, in a second cycle, the thermoplastic preforms may be flooded with a PUR component. Alternatively, the second thermoplastic component may be molded onto the preform. Also, the preform may be produced from a first PUR mixture and subsequently flooded with a second FUR mixture. Additional, different cavities may be formed and additional components may be added in further cycles. Additional thermoplastic components can be molded and/or additional PUR mixtures may be provided for flooding purposes.

Various pretreatments in the free half-molds of the middle platen may be made during the production process of the preforms and/or during the flooding or molding onto the preforms.

The processing of PUR mixtures oftentimes involves the use of so-called mold release agents to avoid adhesion of the PUR component in the half-mold. A mold release agent may be added into the free PUR half-mold or into the free PUR half-molds, for example via a spraying process. Furthermore, there is sufficient time for the mold release agent to vent, without causing an increase in the cycle period. Also, the mold release agent may be vented in a targeted manner, e.g., by using air to blow the PUR half-mold clear. Alternatively, PUR residues may be removed by cleaning the free half-molds, e.g., by means of rotating brushes or by means of a plasma process, etc.

Further, the PUR half-molds may be dyed before the PUR addition. The dye bonds with the subsequently introduced PUR material. In this manner, coated components can be produced in the mold (also known as in Mold Coating (IMC) process). In accordance with an exemplary method of the present invention, varnish may be added into the free PUR half-mold for an In Mold Coating process while, in a first cycle, a plastic base component is molded. In the second cycle, PUR material is flooded between the base component and the coated PUR half-mold. In this manner, an additional surface finish (coat of varnish) may be realized cycle-synchronously with a 2-component process.

Furthermore, inserts and/or decoration materials such as fabrics, foils, etc. may be inserted and affixed for the subsequent processes. A PUR coating may then be introduced between the insert (e.g., a foil) and the plastic carrier. It is hereby advantageous that the PUR material build up only a low internal mold pressure so as to be prevented from damaging the insert. This method is of particular advantage when sensitive decoration materials and varnished foils are involved. In addition, because of the insert, there is no need to add a mold release agent for the PUR half-mold. It is also possible to position the inserts only on areas of the surface of the PUR half-mold. This allows for production of a surface comprised of the insert material and the inserted PUR material.

The present invention is also advantageous with respect to producing a pair of plastic molded parts, comprised of a right part and a left part. Such a pair may be produced in each cycle if the right part is produced in the one parting plane and the left part is produced in the other parting plane. This can be done simultaneously and in the same cycle.

According to another feature of the present invention, the middle platen may have a prism-shaped configuration with more than four mold platen areas. For example, the middle platen may be hexagonal or octagonal with six or eight mold platen areas, respectively.

Suitable combinations of injection units and PUR mixing heads are provided at the outer platens and/or the outer half-molds, depending on the application.

The production of multi-component plastic molded parts from a thermoplastic base component that is to be flooded with a PUR component, may involve the provision of known injection units on the outer platens and their docking to the outer half-molds, while the mixing heads for flooding with a PUR mixture may be docked laterally at the outer half-molds, for example in an "L" position with respect to the respective injection unit or in a vertical position. The mixing heads may be securely mounted on the half-molds or, using suitable robots, may be docked onto the half-molds, for example, only for the time period of flooding the preform with the PUR mixture. A single PUR metering facility may supply the PUR mixture to multiple PUR mixing heads. Of course, it is also conceivable to provide each mixing head with its own PUR metering facility.

During the manufacturing process of multi-component plastic molded parts from multiple thermoplastic components, further injection units may be provided in an L-position, a piggyback position, or a vertical position, in addition to the injection units at the outer platens.

A suction or exhaust device may be provided above the area of the free half-molds of the middle platen and/or the outer platens.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which:

FIG. 8 is a schematic illustration of the clamping unit in closed position, with the confronting half-molds of FIG. 7 being closed and locked;

FIG. 9 is a schematic illustration of removal of different finished components from the half-molds;

FIG. 10 is a schematic illustration of a clockwise rotation of the middle platen to confront different half-molds;

FIG. 11 is a schematic illustration of a pretreatment at free half-molds;

FIG. 12 is a schematic illustration of one parting plane remaining unused;

FIG. 13 is another schematic illustration of one parting plane being unused;

DETAILED DESCRIPTION OF PREFERRED EMBODIMENTS

Figure 1:
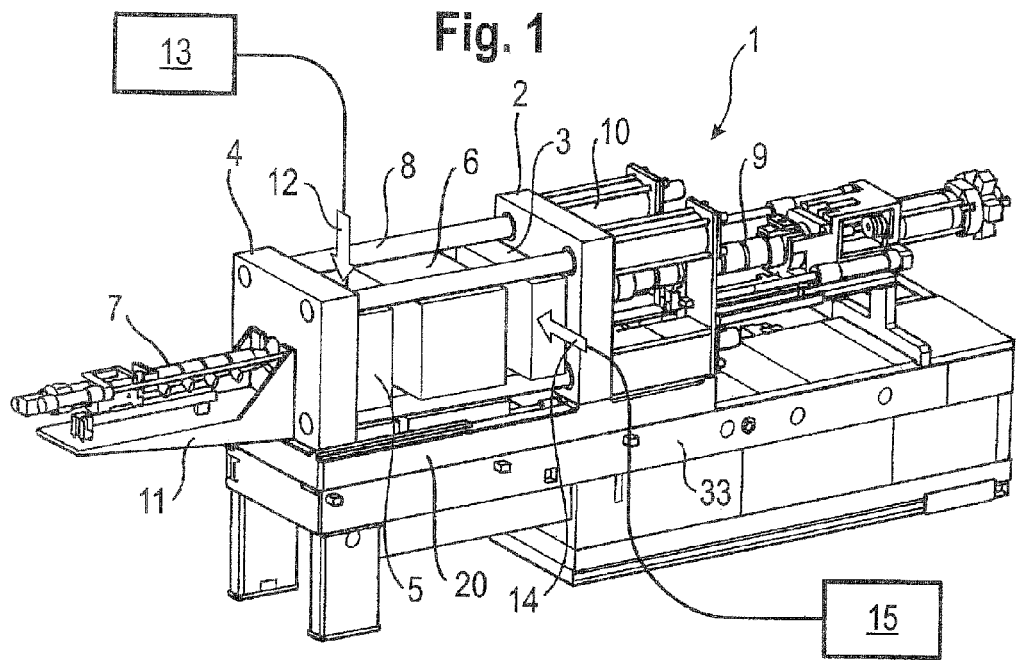
FIG. 1 shows a perspective view of an injection molding machine in accordance with an exemplary embodiment of the present invention.

Throughout all the figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawings, and in particular to FIG. 1, there is shown an injection molding machine 1 having a machine bed 35, a fixed platen 2, a movable platen 4, and a cube-shaped middle platen 6 between the platens 2, 4. The platens 2, 4 support half-molds 3, 5,respectively, which, together with half-molds of the platen 6, form cavities. The movable platen 4 is moved towards or away from the platen 2 via tie-bars 8 that are extended through the fixed platen 2. Also shown is a drive 10 to move the platen 4, and injection units 7, 9. The injection unit 7 is supported on a frame 11 which is mounted to the movable platen 4, whereas the injection unit 9 is supported on the machine bed 23. A first PUR mixing head 12 is docked to the movable half-mold 5 and connected to a first PUR metering facility 13. A second PUR mixing head 14 is docked to the fixed half-mold 3 and connected to a second PUR metering facility. The entire assembly comprised of the drive 10 and the platens 2, 4, 6 is supported on a module frame 20, which, in turn, is mounted on the machine bed 33 of the injection molding machine.

Figure 2:
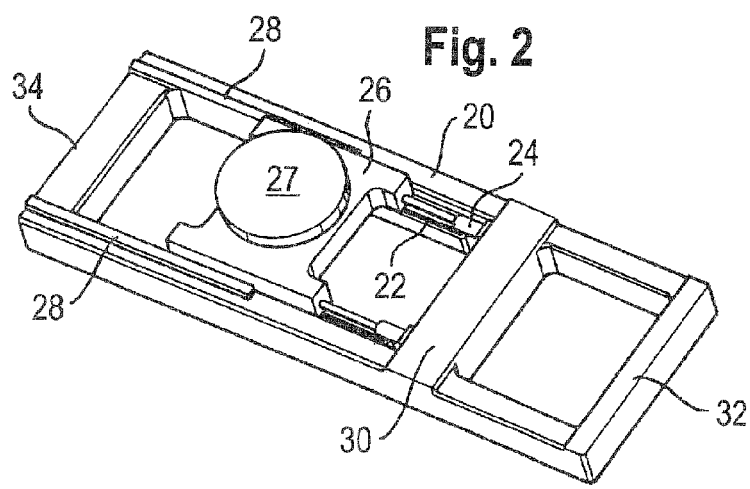
FIG. 2 shows a perspective top view of a module frame of the injection molding machine of FIG. 1.
Figure 3:
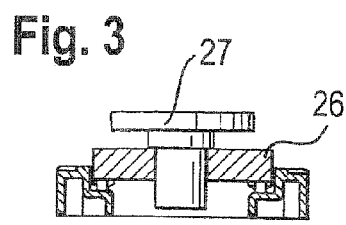
FIG. 3 shows a sectional view of a turntable or rotary table of the module frame illustrated in FIG. 2.

FIG. 2 shows a perspective top view of details of the module frame 20, and FIG. 3 shows a sectional view of a turntable 27 in the module frame 20. The module frame 20 supports a base plate 26 for movement in linear guides 22. The base plate 26 may be moved hereby in the longitudinal direction of the machine via hydraulic cylinder 24 or spindle drives or in some similar manner. The base plate 26 supports the turntable 27, which is rotatably supported on the base plate 26 via suitable bearings. The upper side of the module frame 20 has sliding guides 28 for the movable platen 4. A strut 30 receives the fixed platen 2. Struts 32, 34 close the module frame 20 to the outside and may, for example, support the plate of the drive. The rotatably supported turntable 27 may be driven, for example, via a gear ring and an intermeshing bevel that meshes with the gear ring, as is known in international publication WO 01/10624 A1.

Turning now to FIGS. 4 to 10 which show schematic illustrations of the process sequence.

Figure 4:
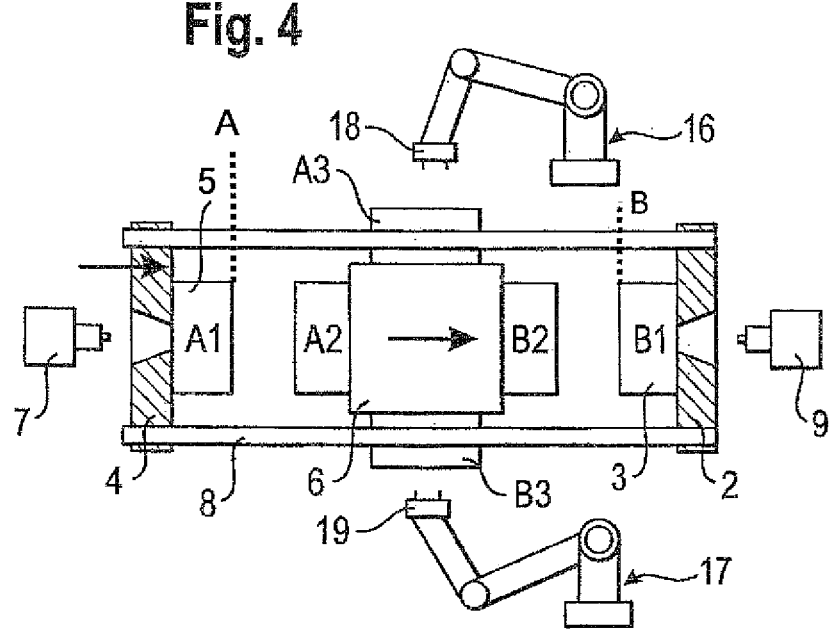
FIG. 4 is a schematic illustration of a starting position of a clamping unit, with confronting half-molds in open position.
Figure 5:
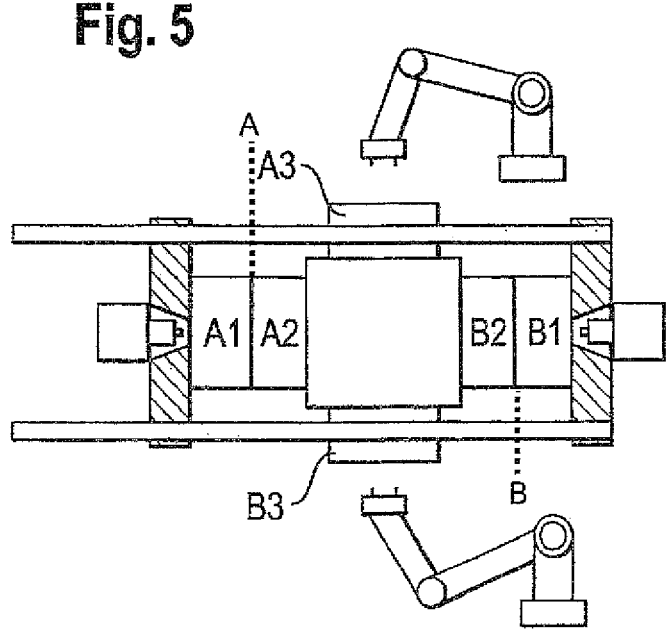
FIG. 5 is a schematic illustration of the clamping unit in closed position, with the confronting half-molds being closed.
Figure 6:
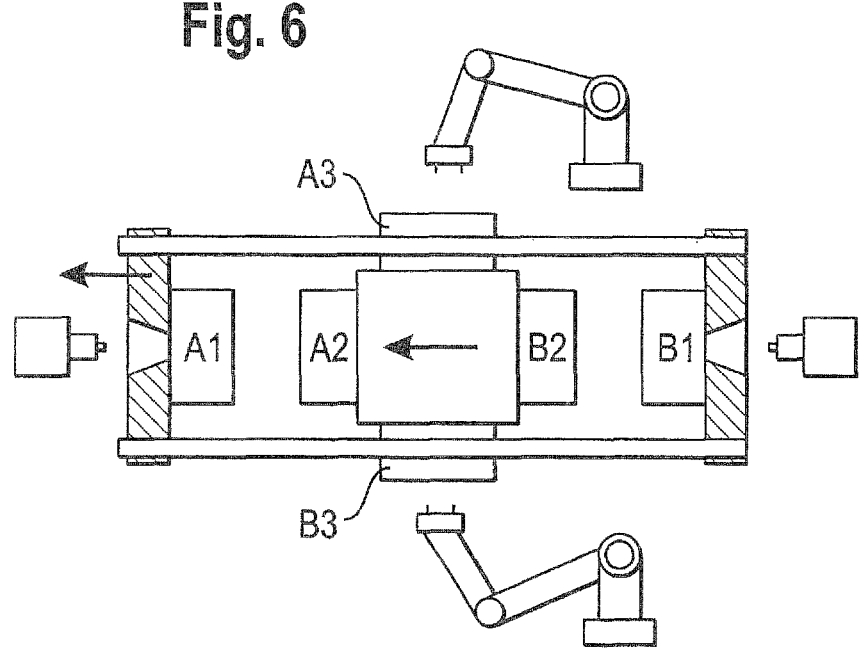
FIG. 6 is a schematic illustration of an opening movement of the clamping unit.

FIG. 4 shows a starting situation at the beginning of a cycle, in which the clamping unit of the injection molding machine is open. Subsequently, the clamping unit is closed by a closing movement, as indicated by the arrows, and then locked. This situation is shown in FIG. 5. The half-molds A1 and A2 now form a first cavity A1+A2 in the first parting plane (parting plane A) for producing a preform of the component A. Likewise, the half-molds B1 and B2 form a first cavity B1+B2 in the second parting plane (parting plane B) for producing a preform of the component B. By means of the injection units 7, 9, thermoplastic melt is injected into the thus-formed cavities, and preforms for the components A and B are produced. Simultaneously, a pretreatment may be performed in the free half-molds A3 and B3 via robots 16 and 17 and their gripper and pretreatment units 18, 19. For example, a mold release agent may be sprayed onto the surfaces of the half-molds A3, B3.

Figure 7:
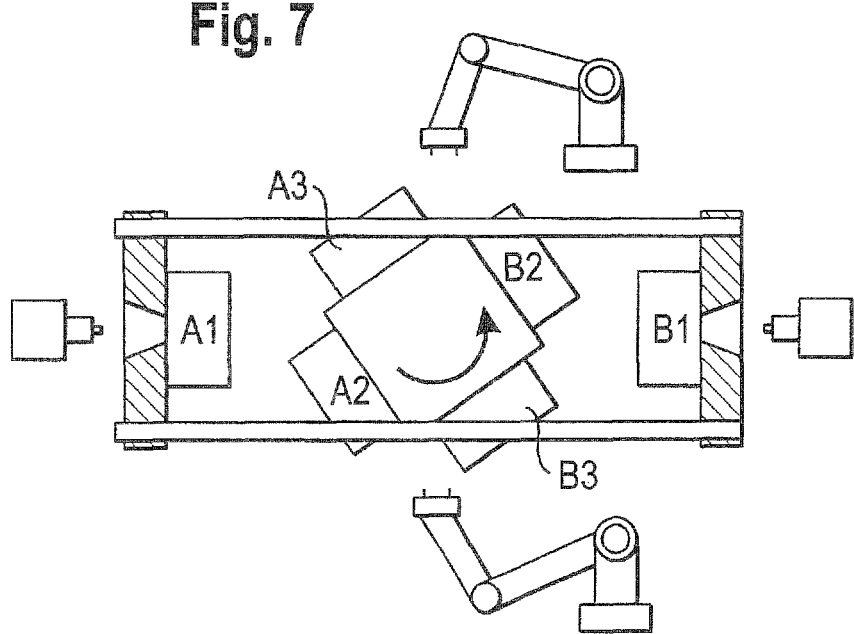
FIG. 7 is a schematic illustration of a counterclockwise rotation of a middle platen of the injection molding machine of FIG. 1 to confront different half-molds.

In the next step, the clamping unit is opened by an opening movement (FIG. 6), with the preforms remaining attached to the outer half-molds A1, B1. Subsequently, the middle platen 6 is rotated by 90°, counterclockwise, as shown in FIG. 7, or clockwise, as shown in FIG. 10,and the clamping unit is closed and locked again, resulting in a situation as shown in FIG. 8. The half-molds A3, A1 and the half-molds B3, B1 now form new cavities, respectively, in which the thermoplastic preforms are situated. By means of the PUR mixing heads 12, 14, the thermoplastic preforms can now be flooded with a PUR molding skin. After the reaction time for the PUR reaction lapses, the clamping unit can be opened and the finished components A, B can be removed from the half-molds A1, B1. This is shown in FIG. 9, which also schematically shows that the components A and B are different. For example, the A component may be the left part and the B component may be a right part of a pair of plastic molded parts, such as the left and right door lining of a car door. Subsequently, the middle platen 6 is rotated back by 90° and the clamping unit assumes its starting position again, as shown in FIG. 4. A new cycle may now begin.

A suction device may be arranged outside the clamping unit above the lateral area of the half-molds A3, B3 in FIG. 4. This ensures that gases produced by the mold release agent gases and, optionally, varnish are exhausted to comply with safety guidelines, when the half-molds A3, B3 are used PUR half-molds.

It is not necessary that both components A and B be removed simultaneously. Optionally, only the parting plane B may be opened, and the parting plane A may be kept closed. This may be necessary if the PUR mixtures in the two parting planes A and B have different reaction times and/or if the thermoplastic components require different cooling periods. In this manner, the two components A and B may be removed by the same robot, which is successively moved into the parting planes A, B to the half-molds A1 and B1.

Instead of the pretreatment described above, other pretreatments or process steps may be performed at the free half-molds, depending on the application. For example, the free half-molds may be cleaned. In PUR processing, it is repeatedly necessary to clean the PUR half-molds, since PUR processing results in deposits on the mold surface. Mold areas or mold-halves may be cyclically cleaned using a plasma process, for example. It is also possible to apply a varnish for an In Mold Coating process in this cycle. It is also possible to place inserts or decoration materials such as fabrics or foils in the free half-molds and to secure them there. The finished component then comprises the two plastic components and the insert or the decoration material.

In the event, the second component does not involve a PUR mixture but involves an additional thermoplastic component to be molded on, additional injection units may be provided in a known manner in an L-position, a piggyback position or a vertical arrangement on the two platens.

Using the method and apparatus according to the invention, only three mold-halves per component are needed. By contrast, in the standard 2-component method using the above-described reversing plate techniques, four mold-halves per component are needed. Based on a cycle period of, e.g., 60-70 seconds for a finished component on a turntable-type injection molding machine or a reversing plate injection molding machine, a cycle period of 90-100 seconds is needed for producing the same component using the method according to the invention. However, two components A and B are produced in one cycle, resulting in a cycle period of about 45-50 seconds per component. This leads to a relatively significant cycle period advantage.

In addition, using the injection molding machine according to the invention, two different components may be produced (left component and right component), whereas, conventionally, two machines are necessary. Only one mold set having three half-molds per component is needed. In a standard reversing plate application, at least four half-molds are needed. As a result, the mold cost per component is significantly minimized.

Removal devices may be mounted on the fixed and/or the movable platen. It is further possible to mount a single removal device, e.g., a 6-axis-robot, on the middle platen. In this manner, one removal device can be used for both parting planes A and B.

FIG. 11 shows schematically the presence of a heat pretreatment at the free half-molds A2, B2. For this purpose, the two laterally positioned robots 16, 17 have radiant heaters 35, 36 by means of which heating fields 37, 38 can be generated. The radiant heaters 35, 36 may perform a pretreatment of the entire areas or of partial areas of the free half-molds A2, A3, B2 and B3, while, simultaneously, an injection molding process and/or a PUR molding process is performed in the respectively closed half-molds. Particularly when a thermoplastic preform is flooded with a PUR mixture, preheating of the entire areas or of partial areas of the PUR half-molds A3, B3 is advantageous because the PUR reaction may then be accelerated and improved PUR surfaces may be realized. During the reaction time, the PUR half-mold cools down again to a temperature that is preset by a medium for maintaining a temperature so as to carry off the reaction heat and to prevent the thermoplastic preform from excessively heating up.

FIGS. 12 and 13 show exemplary embodiments of the invention wherein one parting plane remains free. According to FIG. 12, a dummy mold 39 (B1D) is mounted on the fixed platen 2 in the parting plane of the half-molds B. The half-molds B2, B3 are not needed. According to in FIG. 13, dummy molds 40 (B2D) and 41 (B3D) are mounted on the middle platen 6. The half-mold B1 is not needed. However, it is also possible to replace all three half-molds B1, B2 and B3 with respective dummy half-molds B1D, B2D, and B3D. Typically, however, it is sufficient to provide only one dummy half-mold B1D instead of the three half-molds B1, B2, and B3. By using dummy molds B1D, B2D and/or B3D, the working plane may be continued to be operated with the A-molds and, simultaneously, the B-molds outside the injection molding machine may be examined or processed, e.g., to correct surface defects. The dummy molds serve as place holders for the actual B-molds.

Figure 14:
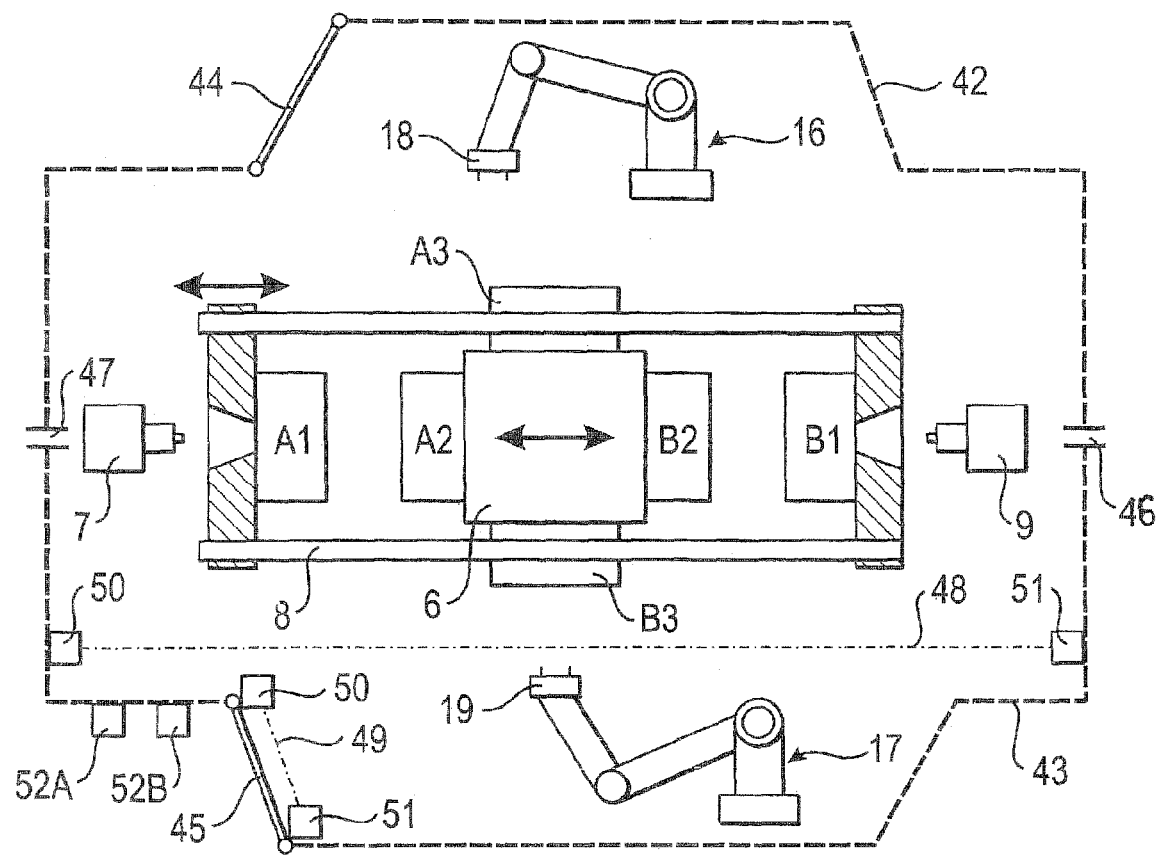
FIG. 14 shows a schematic illustration of an apparatus according to the present invention, having incorporated a safety device.

FIG. 14 shows an exemplary embodiment of the invention having a safety device. The apparatus according to the invention is surrounded by a safety fence 43 on the operator side, and a safety fence 42 opposite to the operator side of the apparatus. The safety fences 42, 43 include safety doors 44, 45. The two safety fences abut at positions 46, 47 and may be connected with each other there so as to form a closed safety area. Instead of the two safety fences 43, 44, only one safety fence may be provided that has one or more safety doors. Parts of the injection molding machine may protrude from the safety fence where the safety fences abut (positions 46, 47), for example parts of the respective plasticizing units. Furthermore, additional safety measures may be provided. For example, light barriers 48, 49 may be provided, which substantially include a light source 50 and a receiver or detector 51, and which are connected to a control unit for the safety measures via wires (not shown). Also, a safety assembly may be provided, for example two switches 52a, 52b arranged at a certain distance from each other and which only generate a release signal to operate the machine if they are actuated simultaneously. The distance of the two switches 52a, 52b is chosen such that the operator may actuate the switches 52a, 52b simultaneously only with spread arms.

Figure 15:
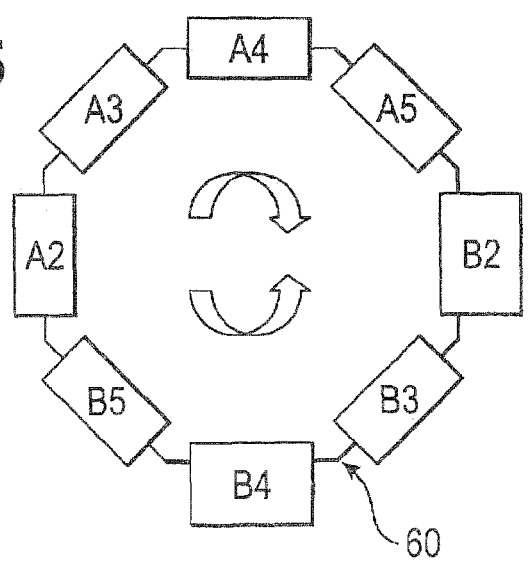
FIG. 15 shows a schematic illustration of a variation of a rotatable middle platen.

Instead of the platen 6 having two half-molds per parting plane (A2, A3 or B2, B3), more than two half-molds per parting plane may be provided on the middle platen 6, depending on how many components are to be attached in the subsequent cycles to the preforms produced in the first cycle. FIG. 15 shows schematically an exemplary embodiment of a rotatable middle platen 60, wherein more than four half-molds per parting plane are provided, namely A2, A3, A4 and A5 for the unillustrated half-mold A1, and B2, B3, B4 and B5 for the unillustrated half-mold B1.

Figure 16:
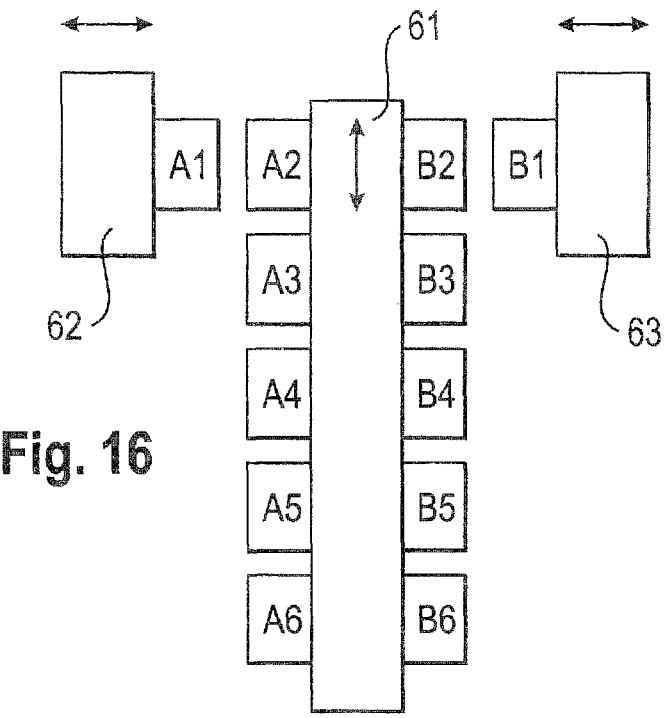
FIG. 16 shows a schematic illustration of an apparatus according to the present invention, having a linearly movable middle platen.

FIG. 16 shows schematically an exemplary embodiment of the present invention having a linearly movable middle platen 61 that has two parallel platen areas, e.g., in the form of a rectangular mold mounting plate. The half-molds A2, A3, ... B2, B3, ... may be affixed on both sides of this middle platen and may engage with the outer half-molds A1 and B1 so as to form different cavities from cycle to cycle. In FIG. 16, the middle platen 61 is fixed with respect to the longitudinal direction of the machine, whereas the outer platens 62 and 63 with the outer half-molds A1 and B1 may be moved in the longitudinal direction of the machine. The middle platen 61 is movable perpendicularly to the longitudinal axis of the machine, e.g., horizontally or vertically, so that, from cycle to cycle, the half-molds A2, A3 ... and B2, B3, ... and the outer half-molds A1 and B2 may be brought together. It is also possible to provide a fixed outer platen and a movable outer platen, in which case the middle platen 61 is movable in the longitudinal direction of the machine.

Figure 17:
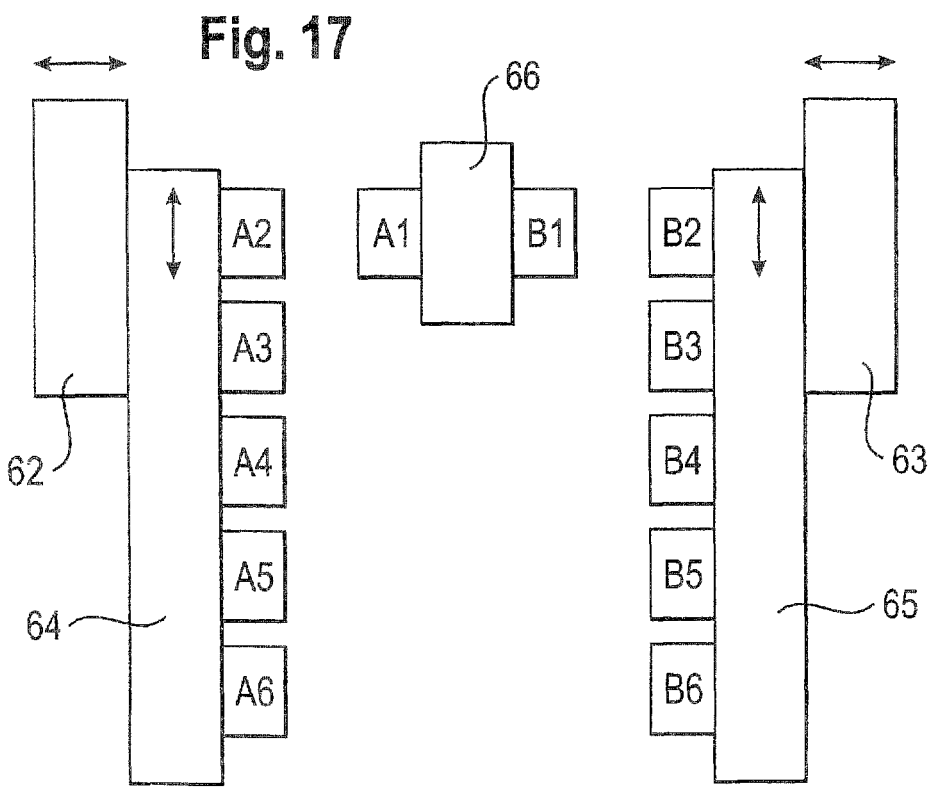
FIG. 17 shows a schematic illustration of an apparatus according to the present invention, having a fixed middle platen and outer sliding tables.

FIG. 17 shows schematically another exemplary embodiment of the present invention, wherein the half-molds A1, B1 are mounted on a fixed middle platen 66, and wherein the additional half-molds A2, A3, ... and B2, B3, ... are mounted on outer sliding tables 64 and 65. The outer sliding tables 64 and 65, in turn, are movably mounted to the outer platens 62 and 63 and may be moved together with the outer platens 62 and 63. However, it is also possible to provide a fixed outer platen and a movable outer platen, in which case the middle platen 66 is movable in the longitudinal direction of the machine.

A suitable apparatus thus includes two outer platens having outer half-molds and a middle platen having intermediate or middle half-molds. Further, provided is a clamping unit for closing and locking four half-molds, wherein two parting planes are formed. The half-molds are hereby arranged in such a manner that, from cycle to cycle, successively different cavities are simultaneously formed in both parting planes. In the one parting plane, the A half-molds (A1, A2, A3, ...) are brought together, and in the other parting plane, the B half-molds (B1, B2, B3, ...) are brought together, with the A1 half-mold being brought together in increments with the other A half-molds, and with the B1 half-mold being brought together in increments with the other B half-molds. In this manner, successively different cavities may be formed from cycle to cycle in the two parting planes. In the one parting plane, the cavities A1+A2, A1+A3, A1+A4, ... are formed, and, in the other parting plane, the cavities B1+B2, B1+B3, B1+B4, ... are formed. The A and B half-molds may be configured so as to produce identical or different molded parts. In the latter case, a right part and a left part of a pair of molded parts may be involved, for example, such as parts of a door lining of an automobile. Furthermore, injection units and/or PUR facilities may be provided which are docked onto or can be docked onto the platens and/or the half-molds.

The middle platen 6 may have at least two A half-molds (A2, A3, ...) that are different from each other and at least two B half-molds (B2, B3, ...) that are different from each other. The outer half-molds A1 and B1 are mounted on the outer platens 2, 4, which can be embodied as classic mold platens, for example. In the two parting planes, successively different cavities may be formed from cycle to cycle: A1+A2, A1+A3, ... in the one parting plane and B1+B2, B1+B3, ... in the other parting plane. The half-molds are constructed in such a manner that they can hold the preforms in them. The middle platen 6 may be rotatable. The middle platen 6 may be cube-shaped or prism-shaped, and rotatable about a vertical or horizontal axis so that the different cavities may be formed from cycle to cycle in the two parting planes.

As an alternative, the middle platen may be plate-shaped or similarly shaped and includes two parallel platen areas, with the A half-molds (A2, A3, ...) relating to or assigned to the first A half-mold (A1)) being arranged on the one platen area, and the other B half-molds (B2, B3, ...) relating to or assigned to the first B half-mold (B1) being arranged on the other platen area. The middle platen 6 moves vertically with respect to the longitudinal axis of the machine, from cycle to cycle, so that, from cycle to cycle, different cavities can be formed in the two parting planes.

As a further alternative, the functions of the middle platen 6 and the outer platen 2, 4 can also be reversed. Accordingly, the first A half-mold A1 and the first B half-mold B1 are arranged on the middle platen 6, whereas the other A half-molds (A2, A3, ...) are arranged on one of the outer platens 2, 4 and the other B half-molds (B2, B3, ...) are arranged on the other one of the outer platens 2, 4. The two outer platens 2, 4 can be linearly moved in increments and/or rotated about a horizontal axis in increments so that different cavities are formed in both parting planes, from cycle to cycle. For example, the platens may be sliding tables or turntables which, in turn, may be mounted on the outer platens.

A suitable apparatus includes a fixed platen and a movable platen (the outer platens) arranged on a machine bed, between which the middle platen is moved on a sliding table in the longitudinal direction of the machine and between which the middle platen is pivotable around a vertical axis. The middle platen is cube-shaped and carries four half-molds (A2, A3, B2, B3). Two adjacent ones of these half-molds (A2, A3 or B2, B3) relate to or are assigned to an outer platen to form cavities of different size. The outer half-molds are shaped in such a manner that the preform remains therein.

It is also possible to provide two moving outer platens on a machine bed, with the middle platen being fixedly connected with the machine bed between the outer platens and rotatable about a vertical axis. The middle platen is cube-shaped and carries four half-molds (A2, A3, B2, B3). Two adjacent ones of these half-molds (A2, A3 or B2, B3) relate to or are assigned to an outer platen.

While the invention has been illustrated and described in connection with currently preferred embodiments shown and described in detail it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of making multi-component plastic molded parts, using an apparatus which includes two outer platens with first half-molds, and a middle platen with second half-molds of different types interacting with the first half-molds such as to define cavities in two parting planes for injection of a plastic melt and/or a PUR mixture, the method comprising the steps of:

in a first cycle
- a) closing and locking a first half-mold with a second half-mold of a first type facing the first half-mold to form first cavities in the two parting planes,
- b) injecting a first plastic melt or PUR mixture into the first cavities and producing preforms in the respective first cavities formed in the two parting planes,
- c) opening the respective first cavities formed by the first half-molds and the second half-molds of the first type,
- d) retaining the preforms in the respective first half-molds, in a subsequent cycle
- e) moving second half-molds of a second type different from the first type into the two parting planes so as to face the respective first half-molds with the retained preforms,
- f) closing and locking the first half-molds with the facing second half-mold of the second type to form second cavities in the two parting planes,
- g) injecting a second plastic melt or a PUR mixture into the second cavities and producing overmolded preforms,
- h) opening the respective second cavities formed by the first half-molds and the second half-molds of the second type,
- i) retaining the overmolded preforms in the respective first half-molds, and removing an overmolded preform from the respective first half-molds when the overmolded preform represents a finished multi-component plastic molded part.

2. The method of claim 1, and further executing between cycles a pretreatment step or another process step in free ones of the first and second half-molds.

3. The method of claim 1, wherein the middle platen has a cube-shaped or prism-shaped configuration, said moving step including a step of rotating the middle platen in relation to the outer platens about a vertical axis or a horizontal axis, with the different cavities being formed in the two parting planes from cycle to cycle.

4. The method of claim 1, wherein the injecting step includes a step of molding the preforms from a thermoplastic component in the two parting planes, and the second injection step further comprising a step of flooding the preforms with a PUR mixture in the two parting planes in a second cycle.

5. The method of claim 1, wherein the injecting step includes a step of molding the preforms from a thermoplastic component in the two parting planes, and the second injection step further comprising a step of molding a second thermoplastic component onto the preforms.

6. The method of claim 1, wherein the injecting step includes a step of molding the preforms from a first PUR mixture in the two parting planes, and the second injection step further comprising a step of flooding the preforms with a second PUR mixture in the two parting planes in a second cycle.

7. The method of claim 2, wherein the pretreatment or other process step includes process selected from the group consisting of preheating, addition of a mold release agent, venting of a mold release agent, cleaning, addition of varnish for an In Mold Coating process, and placing and securing at least one of insertion parts and decoration materials.

8. The method of claim 7, wherein the at least one of the insertion parts and decoration materials is selected from the group consisting of fabrics, foils, aluminum strips, and metal strips.

9. The method of claim 1, further comprising the step of successively opening the parting planes.

10. The method of claim 9, wherein the parting planes are successively opened when PUR mixtures in the two parting planes have different reaction times or the preforms in the two parting planes have different cooling periods.

11. The method of claim 1, for production of a pair of plastic molded parts, comprised of a right part and a left part, wherein the right part is produced in one of the parting planes; and the left part is produced in the other one of the parting planes.

12. The method of claim 1, for a production of different plastic molded parts, wherein a main component is produced in one of the parting planes, and a plurality of accessory components are produced in the other one of the parting planes.

13. The method of claim 6, further comprising a step of heating the second half-molds containing the first PUR mixture before the flooding step.

14. The method of claim 6, further comprising a step of subjecting the PUR mixture to a compression during the flooding step to contract or expand the second cavity formed in the respective one of the parting planes.

15. The method of claim 14, wherein the second cavity is contracted or expanded by moving the first or second half-molds or by moving inserts disposed in the first or second half-molds relative to each other.

16. The method of claim 2, wherein the pretreatment is performed by at least one operator; and further comprising a step of providing a safety device and allowing a movement of machine parts only when the at least one operator actuates the safety device.

17. The method of claim 16, wherein the machine parts involve the middle platen or movable outer platens.

18. The method of claim 17, further comprising steps of defining a safety area, monitoring the safety area by light barriers, and allowing a movement of the machine parts only when the at least one operator has left the safety area and actuated the safety device.

19. The method of claim 1, wherein the middle platen additionally includes third half-molds; and the method further comprising: prior to removing the overmolded preform from the respective first half-molds, attaching additional components to the overmolded preforms by moving at least the third half-molds into the two parting planes, and closing and locking the first half-molds with the facing third half-molds to form third cavities in the two parting planes.

* * * * *